United States Patent
Hachisuka

(10) Patent No.: US 7,898,765 B2
(45) Date of Patent: Mar. 1, 2011

(54) THIN-FILM MAGNETIC HEAD WITH GROOVES ON MEDIUM-OPPOSED SURFACE AND MANUFACTURING METHOD OF THE HEAD

(75) Inventor: Nozomu Hachisuka, Tokyo (JP)

(73) Assignee: TDK Corporation, Tokyo (JP)

( * ) Notice: Subject to any disclaimer, the term of this patent is extended or adjusted under 35 U.S.C. 154(b) by 604 days.

(21) Appl. No.: 12/016,011

(22) Filed: Jan. 17, 2008

(65) Prior Publication Data

US 2009/0185314 A1    Jul. 23, 2009

(51) Int. Cl.
G11B 5/187 (2006.01)
(52) U.S. Cl. ...................................... 360/122
(58) Field of Classification Search ................ 360/121, 360/122, 129, 125.72; 29/603.07, 603.12
See application file for complete search history.

(56) References Cited

U.S. PATENT DOCUMENTS

| | | | | |
|---|---|---|---|---|
| 5,289,330 A | * | 2/1994 | Wade | 360/122 |
| 5,867,352 A | * | 2/1999 | Dohmen | 360/130.21 |
| 5,953,184 A | * | 9/1999 | Barber et al. | 360/121 |
| 6,118,626 A | * | 9/2000 | Muftu et al. | 360/122 |
| 6,151,191 A | * | 11/2000 | Muftu et al. | 360/271.1 |
| 6,690,542 B1 | * | 2/2004 | Wang | 360/129 |
| 6,879,470 B2 | | 4/2005 | Johnson et al. | |
| 6,927,937 B2 | * | 8/2005 | Aoki | 360/122 |
| 7,256,963 B2 | * | 8/2007 | Saliba | 360/129 |
| 7,271,983 B2 | * | 9/2007 | Saliba | 360/129 |

FOREIGN PATENT DOCUMENTS

| | | |
|---|---|---|
| JP | A-5-20625 | 1/1993 |
| JP | A-2000-207800 | 7/2000 |
| JP | A-2005-276267 | 10/2005 |

OTHER PUBLICATIONS

U.S. Appl. No. 11/958,123, filed Dec. 17, 2007 for Nozomu Hachisuka et al.

* cited by examiner

*Primary Examiner*—Angel A. Castro
(74) *Attorney, Agent, or Firm*—Oliff & Berridge, PLC

(57) ABSTRACT

Provided is a thin-film magnetic head that can be adequately contacted with the magnetic recording medium, and thus, can perform read and write operations sufficiently and stably. This head comprises: at least one magnetic head element for reading and/or writing data, formed on/above an element formation surface of a substrate; an overcoat layer formed so as to cover the at least one magnetic head element; and a closure adhered on at least a portion of an upper surface of the overcoat layer, wherein a groove, extending in a track width direction, is provided on a medium-opposed surface: in an area on an end surface of the substrate, the area being on a boundary between the substrate and the overcoat layer; or in an area covering end surface portions of the substrate and the overcoat layer, the area thus overlapping the boundary between the substrate and the overcoat layer.

12 Claims, 7 Drawing Sheets

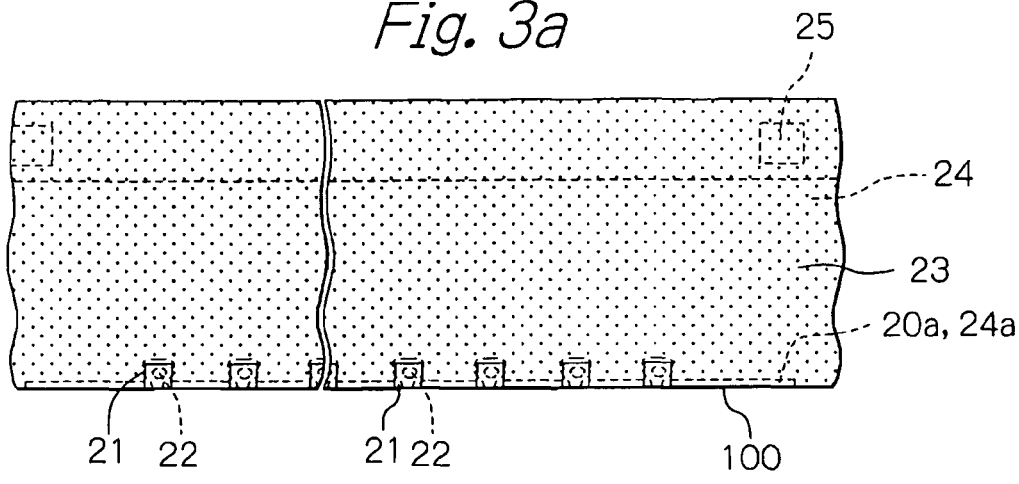
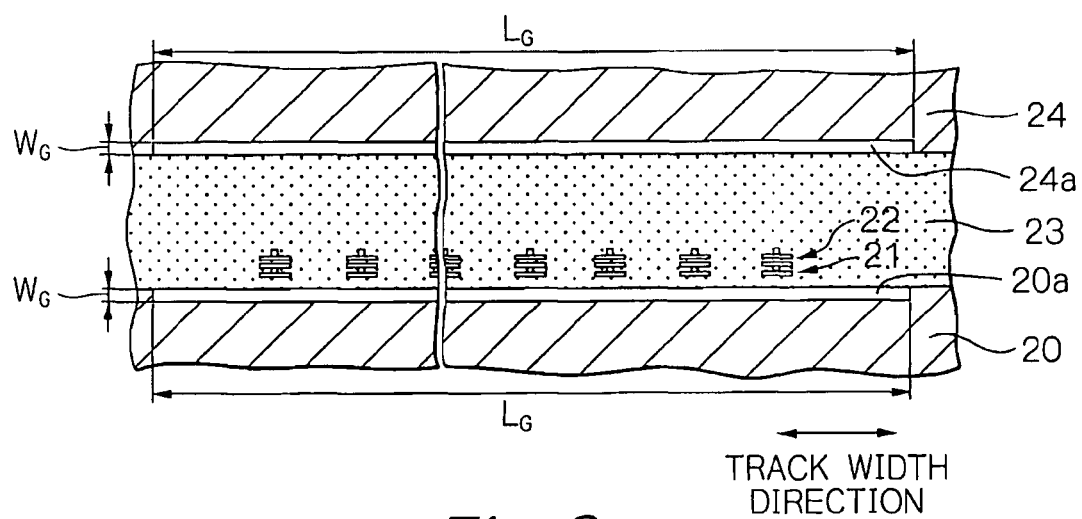
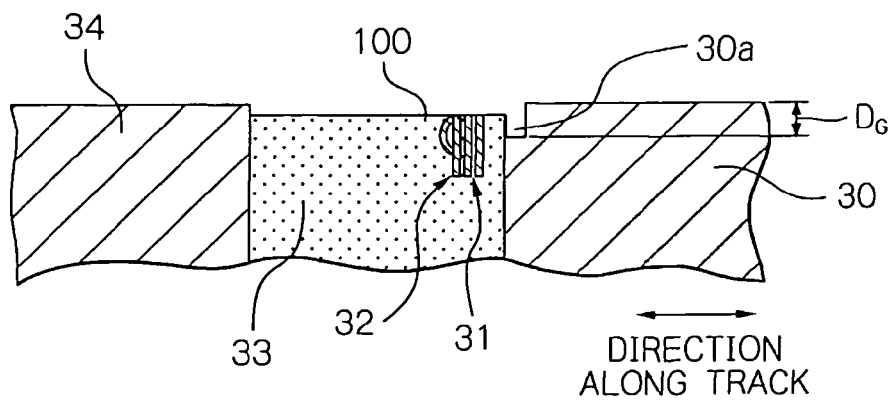

THIN-FILM MAGNETIC HEAD WITH GROOVES ON MEDIUM-OPPOSED SURFACE AND MANUFACTURING METHOD OF THE HEAD

BACKGROUND OF THE INVENTION

1. Field of the Invention

The present invention relates to a thin-film magnetic head for applying to magnetic recording, especially to a tape head for reading data from a magnetic tape and/or writing data to a magnetic tape. The present invention further relates to a manufacturing method of the thin-film magnetic head.

2. Description of the Related Art

In recent years, magnetic recording and reproducing apparatuses have been remarkably improved in capacity of storage data, corresponding to the widespread use of multimedia and the Internet. And magnetic tape apparatuses for backing up or storing data are no exception of this trend of larger capacity, and have been required to be improved in areal recording density corresponding to the larger capacity.

Thin-film magnetic heads are usually used in the above-described magnetic recording and reproducing apparatuses. Especially, widely used are composite-type thin-film magnetic heads including an electromagnetic transducer for writing data to a magnetic recording medium and a magnetoresistive (MR) element for reading data from the medium. The composite-type thin-film magnetic heads have been extensively developed to be more miniaturized and to be improved in performance corresponding to the larger capacity. This development is also true of thin-film magnetic heads for the above-described magnetic tape apparatuses, that is, tape heads.

For the tape heads, it is significantly important to ensure a stable contact between the tape head and a running magnetic tape as a magnetic recording medium. As an approach for the stable contact, for example, Japanese Patent Publication No. 2005-276267A discloses a technique in which the medium-opposed surface of a dummy head part sandwiched between two magnetic head stack parts is recessed from the medium-opposed surface of the two magnetic head stack parts to stably contact a tape head with a magnetic tape. And, for example, Japanese Patent Publication No. 2000-207800A discloses a technique in which cavities are provided on a tape bearing surface (TBS) of a tape head, which is a medium-opposed surface or a sliding surface, and the cavities deform a magnetic tape passing by the cavities to stably contact the tape head with the magnetic tape. Further, for example, Japanese Patent Publication No. 05-20625A discloses a technique in which grooves are provided on the TBS of a tape head to stably contact the tape head with a magnetic tape.

However, there have been especially two problems for the tape heads on the contact between the head and the running magnetic tape. The first problem is that, under the difference in hardness of the constituent materials of the tape head, concavity and convexity (irregularity) may be likely to occur on the TBS due to grinding of the TBS by the contact with the magnetic tape. Here, in tape heads that have electromagnetic transducers, MR elements and an element-covering overcoat layer sandwiched between a head substrate and a closure, the sensing surfaces of the MR elements and the end surface of the overcoat layer are recessed from the surrounding TBS portion by the lapping in the manufacturing process, as described in U.S. Pat. No. 6,879,470. In this case that the TBS has concave and convex portions or a recess portion, and electromagnetic transducers and MR elements are in the concave or recess portion, a space is likely to occur between the element ends of the electromagnetic transducers/MR elements and the surface of the magnetic tape. As a result, a magnetic spacing, which is a distance between the ends of the electromagnetic transducers/MR elements and the surface of the magnetic tape, is likely to increase, which has a possibility of causing insufficient read and write operations by the MR elements and the electromagnetic transducers.

The second problem is that there is a possibility that swarf (dust) generated when the head and the magnetic tape grind each other is stacked and burned to be attached on the TBS. The swarf attached on the TBS causes the space between the head and the running magnetic tape by working as a supporting point, and further causes unstable contact between them. As a result, there occurs a possibility of insufficient read and write operations by the MR elements and the electromagnetic transducers.

BRIEF SUMMARY OF THE INVENTION

Therefore, an object of the present invention is to provide a thin-film magnetic head that can be adequately contacted with the magnetic recording medium, and thus, can perform read and write operations sufficiently and stably, and further is to provide a magnetic tape apparatus provided with the just-described thin-film magnetic head.

Another object of the present invention is to provide a method for manufacturing a thin-film magnetic head that can be adequately contacted with the magnetic recording medium and can perform read and write operations sufficiently and stably.

Before describing the present invention, terms used herein will be defined. In a multilayer structure of element(s) formed on/above an element formation surface of the substrate in a thin-film magnetic head, a layer located on the substrate side in relation to a standard layer is referred to as being located "lower" than, "beneath" or "below" the standard layer, and a portion on the substrate side of a layer is referred to as a "lower" portion. Further, a layer located on the stacking direction side (the opposite side to the substrate) in relation to a standard layer is referred to as being located "upper" than, "on" or "above" the standard layer, and a portion on the stacking direction side of a layer is referred to as an "upper" portion.

According to the present invention, a thin-film magnetic head is provided, which comprises: at least one magnetic head element for reading and/or writing data, formed on/above an element formation surface of a substrate; an overcoat layer formed on the element formation surface so as to cover the at least one magnetic head element; and a closure adhered on at least a portion of an upper surface of the overcoat layer, wherein a groove, extending in a track width direction, is provided on a medium-opposed surface: in an area on an end surface of the substrate, the area being on a boundary between the substrate and the overcoat layer; or in an area covering end surface portions of the substrate and the overcoat layer, the area thus overlapping the boundary between the substrate and the overcoat layer.

In the above-described magnetic head, by providing the groove, a space can vanish, which occurs between the surface of the magnetic recording medium and the element end of the magnetic head element due to the presence of concave and convex portions or a recess portion on the medium-opposed surface. As a result, the magnetic spacing can keep a sufficiently small value. Furthermore, swarf (dust), which is generated when the thin-film magnetic head and the magnetic recording medium grind each other, can be prevented from being stacked and burned to be attached on the medium-opposed surface. As a result, the contact between the thin-film magnetic head and the magnetic recording medium becomes favorable; therefore, read and write operations can be performed sufficiently and stably.

In the thin-film magnetic head according to the present invention, a further groove extending in the track width direction is preferably provided on the medium-opposed surface: in an area on an end surface of the closure, the area being on a boundary between the overcoat layer and the closure; or in an area covering end surface portions of the overcoat layer and the closure, the area thus overlapping the boundary between the overcoat layer and the closure. In this case, further, respective heights of end surfaces opposed to a magnetic recording medium of the substrate, the overcoat layer and the closure are preferably equal or substantially equal with one another, the heights being in a direction perpendicular to the end surfaces. Here, "substantially equal" means that the respective heights of end surfaces are within the allowable range in which the thin-film magnetic head and the magnetic recording medium can be adequately contacted with each other. This preferable configuration can effect sufficient and stable read and write operations more reliably.

According to the present invention, a magnetic tape apparatus is further provided, which comprises: at least one magnetic tape; at least two reels for feeding and/or winding the at least one magnetic tape; at least one thin-film magnetic head described above, for reading data from the at least one magnetic tape and/or writing data to the at least one magnetic tape; and a recording and/or reproducing control circuit for controlling read and/or write operation performed by the at least one thin-film magnetic head.

According to the present invention, a manufacturing method of a thin-film magnetic head is further provided, which comprises steps of: forming: at least one magnetic head element for reading and/or writing data; and an overcoat layer so as to cover the at least one magnetic head element, on/above an element formation surface of a substrate; adhering a closure on at least a portion of an upper surface of the overcoat layer; forming a mask pattern having: an open area on an end surface of the substrate, the open area being on a boundary between the substrate and the overcoat layer; or an open area including end surface portions of the substrate and the overcoat layer, the open area thus overlapping the boundary between the substrate and the overcoat layer, the mask pattern provided on end surfaces to be opposed to a magnetic recording medium of the substrate, the overcoat layer and the closure; and performing etching to the mask-pattern-formed end surfaces to form a groove in the open area.

By using the above-described manufacturing method, thin-film magnetic heads can be obtained, which can be adequately contacted with the magnetic recording medium, and thus, can perform read and write operations sufficiently and stably.

In the manufacturing method according to the present invention, the mask pattern preferably has: a further open area on an end surface of the closure, the open area being on a boundary between the overcoat layer and the closure; or a further open area including end surface portions of the overcoat layer and the closure, the open area thus overlapping the boundary between the overcoat layer and the closure. Further, a resist pattern is preferable used as the mask pattern, and also preferably, the etching is performed by using an ion milling method.

Further, it is also preferable that the manufacturing method according to the present invention further comprises steps of: forming a mask pattern on end surfaces to be opposed to the magnetic recording medium of the substrate and the overcoat layer, after forming the groove; and performing etching to the mask-pattern-formed end surfaces, thereby setting a height in a height direction of a medium-opposed end surface of the closure to be closer or equal to a height in the height direction of a medium-opposed end surface of the overcoat layer. Here, the height direction is defined to be a direction perpendicular to the medium-opposed end surfaces of the closure and the overcoat layer.

Furthermore, it is also preferable that the manufacturing method according to the present invention further comprises steps of: forming a mask pattern on end surfaces to be opposed to the magnetic recording medium of the overcoat layer and the closure, after forming the groove; and performing etching to the mask-pattern-formed end surfaces, thereby setting a height in the height direction of a medium-opposed end surface of the substrate to be closer or equal to a height in the height direction of a medium-opposed end surface of the overcoat layer.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE SEVERAL VIEWS OF THE DRAWINGS

FIGS. 3a and 3b show cross-sectional views taken along respective planes B and C shown in FIG. 1b, illustrating a main portion of one embodiment of the thin-film magnetic head according to the present invention;

FIG. 3c shows a cross-sectional view taken along a plane corresponding to plane A shown in FIG. 1b, illustrating a main portion of an alternative concerning the grooves on the TBS according to the present invention;

DETAILED DESCRIPTION OF THE INVENTION

Figure 1A:
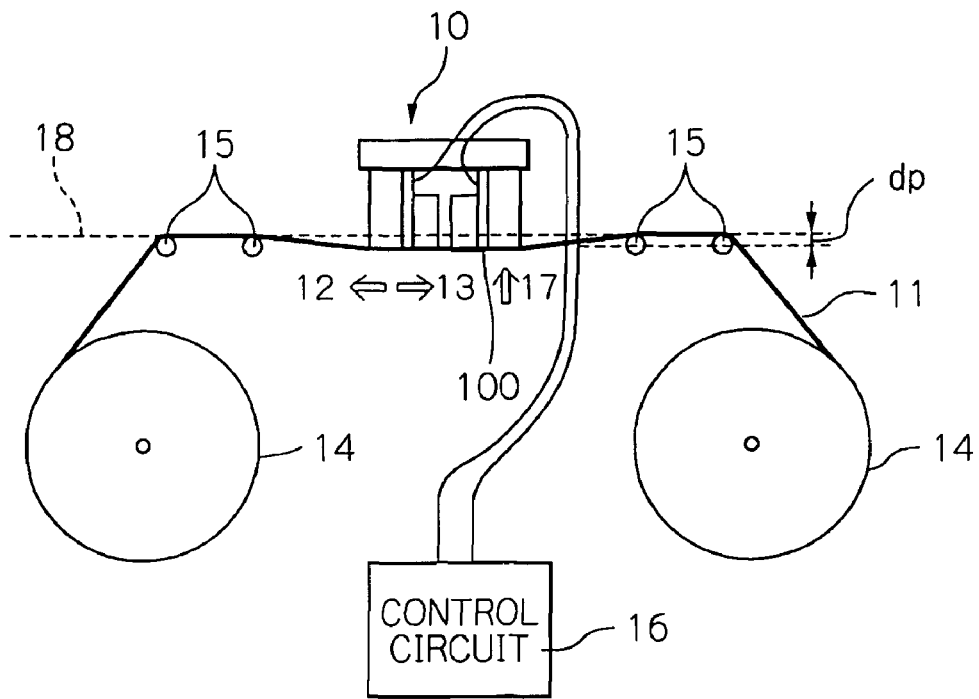
FIG. 1a shows a schematic view illustrating the main part of one embodiment of the magnetic tape apparatus according to the present invention.
Figure 1B:
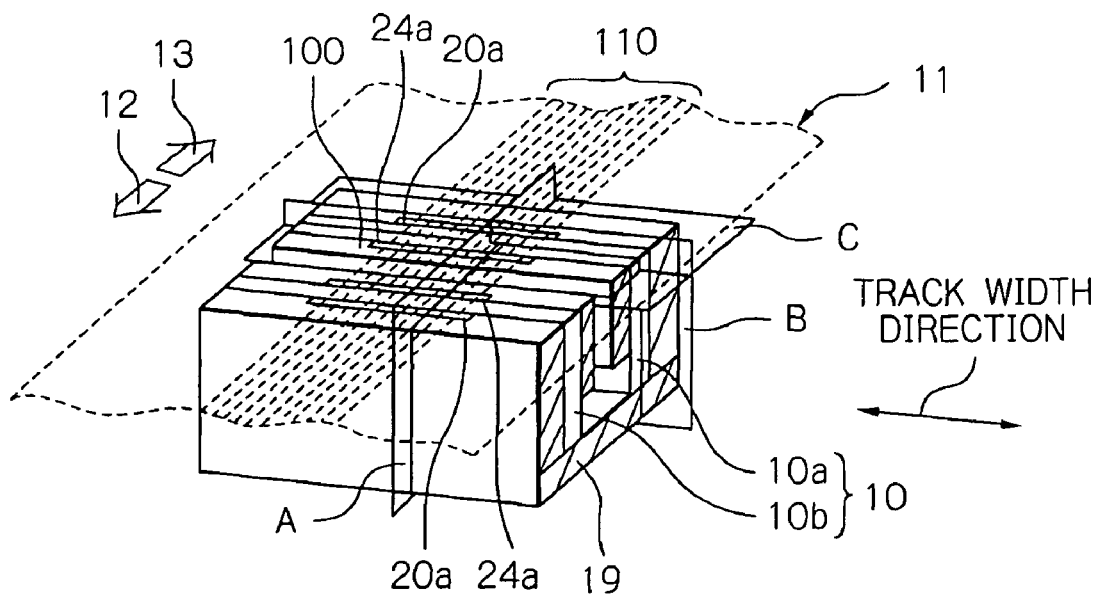
FIG. 1b shows a perspective view schematically illustrating one mode of the configuration of the magnetic recording medium and the thin-film magnetic head according to the present invention.

FIG. 1a shows a schematic view illustrating the main part of one embodiment of the magnetic tape apparatus according to the present invention. And FIG. 1b shows a perspective view schematically illustrating one mode of the configuration of the magnetic recording medium and the thin-film magnetic head according to the present invention.

As shown in FIG. 1a, the magnetic tape apparatus of the present embodiment includes: a magnetic tape 11 as a magnetic recording medium; a tape head 10 as a thin-film magnetic head for performing read and write operations to the magnetic tape 11; reels 14 for winding and unwinding (feeding) the magnetic tape 11; guide pins 15 for guiding the running of the magnetic tape 11; and a recording/reproducing control circuit 16.

The tape head 10 is provided for reading and writing data signals, whose tape baring surface (TBS) 100, which is the end surface on the magnetic tape 11 side or a medium-opposed surface (opposed-to-medium surface), is contacted with the magnetic tape 11 running in the direction of arrow 12 or 13. That is, the TBS 100 of the tape head 10 acts as a sliding surface.

The tape head 10 and the guide pins 15 are positioned so that a predetermined suppress force 17 works to cause the tape head 10 and magnetic tape 11 to head toward each other. The suppress force 17 can be adjusted by the distance (penetration) $d_P$ with which the tape head 10 is held down from the common tangent line 18 drawn on the tape-contact sides of the guide pins 15. The suppress force 17 intends to the appropriate contact between the tape head 10 and the magnetic tape 11. The recording/reproducing control circuit 16 is provided for controlling the read and/or write operations of the tape head 10.

As shown in FIG. 1b, the magnetic tape 11 has a plurality of tracks 110. The tape head 10 includes the first head part 10a and the second head part 10b, and a frame 19 that supports both of the head parts. During read and write operations, the magnetic tape 11 runs in the direction of the arrow 12 or 13. The tape head 10 performs data-reading and data-writing operations to the tracks 110 of the magnetic tape 11, the TBS 100 of the head 10 being contacted with the running tape 11. In the case that the magnetic tape runs in the direction of arrow 12, for example, the first head part 10a on the trailing side may write, and the second head part 10b on the leading side may read. Whereas, in the case of the tape run in the direction of arrow 13, the head parts may be counterchanged with respect to their read and write operations. As a matter of course, a configuration in which the tape head 10 includes either of the first head part 10a or the second head part 10b is also within the scope of the present invention.

Each of the first and second head parts 10a and 10b has grooves 20a and 24a extending in the track width direction on the TBS 100. As described later, the ends reaching (extending to) the TBS of the head elements are positioned between the grooves 20a and 24a in the direction along track, and thus, the ends can keep in adequate contact with the running magnetic tape 11. As a result, sufficient and stable operations of reading and writing can be performed.

Figure 2:
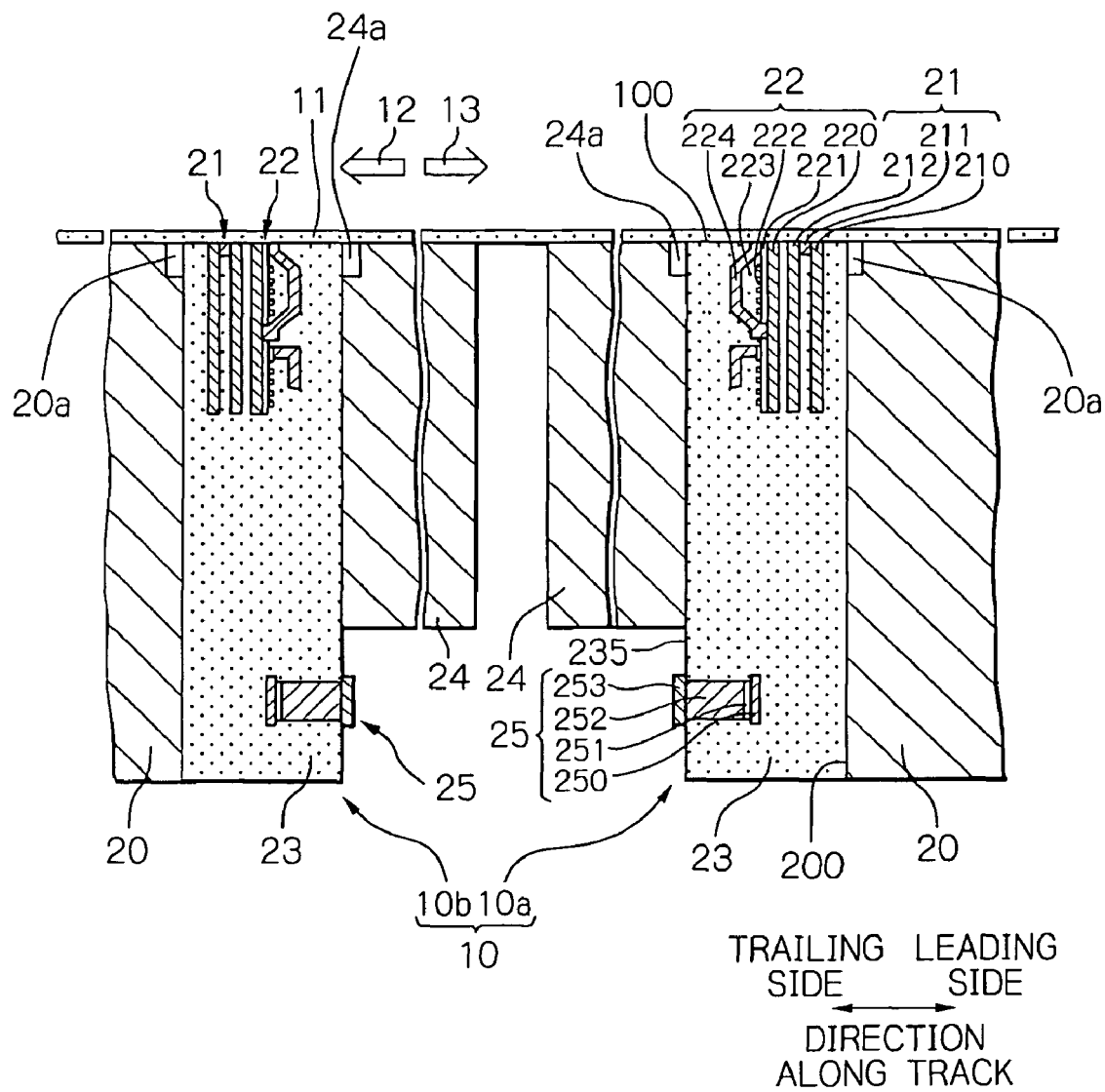
FIG. 2 shows a cross-sectional view taken along plane A shown in FIG. 1b, illustrating a main portion of one embodiment of the thin-film magnetic head according to the present invention.

FIG. 2 shows a cross-sectional view taken along plane A shown in FIG. 1b, illustrating a main portion of one embodiment of the thin-film magnetic head according to the present invention. In FIG. 2, a terminal electrode 25 may not practically appear on the cross-section taken along the plane A, however, is presented on the cross-section for convenience of explanation. Further, the first and second head parts 10a and 10b of the tape head 10 are opposed with each other in the direction along track, and have the common structure corresponding to each other. Therefore, only the first head part 10a will be explained below.

As shown in FIG. 2, the first head part 10a of the tape head 10 includes: a head substrate 20 made of, for example, AlTiC ($Al_2O_3$—TiC), having an element formation surface 200 perpendicular to the TBS 100; a magnetoresistive (MR) element 21 as a read head element for reading data signals, formed on/above the element formation surface 200; an electromagnetic transducer 22 as a write head element for writing data signals, formed directly above the MR element 21; an overcoat layer 23 formed on the element formation surface 200 so as to cover the MR element 21 and the electromagnetic transducer 22; a closure 24 made of, for example, AlTiC ($Al_2O_3$—TiC), adhered to a portion of the upper surface 235 of the overcoat layer 23, the other portion of the upper surface 235 being exposed; a groove 20a formed in the end surface on the TBS 100 side of the head substrate 20; a groove 24a formed in the end surface on the TBS 100 side of the closure 24; and a plurality of terminal electrodes 25 formed in the exposed portion of the upper surface 235 of the overcoat layer 23.

In the present embodiment, provided in the element formation surface are: a plurality of MR elements 21 and a plurality of electromagnetic transducers 22, both of which are aligned in the track width direction corresponding to a plurality of tracks 110 (FIGS. 3a and 3b). However, in FIG. 2, only one of the elements 21 and one of the transducers 22 are presented on the cross-section taken along the plane A of FIG. 1b.

The MR elements 21 and electromagnetic transducers 22 are electrically connected to their respective terminal electrodes 25. One ends of the MR elements 21 and electromagnetic transducers 22 reach (extend to) the TBS 100 and contact with the magnetic tape 11. In the just-described configuration, during read and write operations, each of the electromagnetic transducers 22 writes data signals by applying signal magnetic fields to the corresponding track of the running magnetic tape 10, and each of the MR elements 21 reads data signals by sensing signal magnetic fields from the corresponding track of the running magnetic tape 10.

As shown in FIG. 2, each of the MR elements 21 includes: an MR multilayer 211; and a lower shield layer 210 and an upper shield layer 212, disposed so as to sandwich the MR multilayer therebetween. The upper and lower shield layers 212 and 210 work for preventing the MR multilayer 211 from receiving an external magnetic field as a noise. Each of the upper and lower shield layers 212 and 210 is a magnetic layer formed of, for example, FeSiAl (Sendust), NiFe (Permalloy), CoFeNi, CoFe, FeN, FeZrN or CoZrTaCr, or a multilayer of these materials with thickness of approximately 0.5 to 3 μm (micrometers), made by using, for example, a frame plating method or a sputtering method.

The MR multilayer 211 is a magneto-sensitive portion for sensing signal magnetic fields by utilizing an MR effect, and may be, for example, an anisotropic magnetoresistive (AMR) multilayer that utilizes an AMR effect, a giant magnetoresistive (GMR) multilayer that utilizes a GMR effect, or a tunnel magnetoresistive (TMR) multilayer that utilizes a TMR effect. Further, in the case of the GMR multilayer, the MR multilayer 211 may be a current-in-plane giant magnetoresistive (CIP-GMR) multilayer, or a current-perpendicular-to-plane giant magnetoresistive (CPP-GMR) multilayer. Any MR multilayer 211 utilizing one of these MR effects senses signal magnetic fields from the track 110 of the magnetic tape 11 with high sensitivity. In the case that the MR multilayer 211 is a CPP-GMR multilayer or a TMR multilayer, the upper and lower shield layers 212 and 210 also act as electrodes. Whereas, in the case that the MR multilayer 211 is an AMR multilayer or a CIP-GMR multilayer, insulating layers are provided between the MR multilayer 211 and respective upper and lower shield layers 212 and 210, and further, MR lead layers are provided to be electrically connected with the MR multilayer 211.

As shown in FIG. 2, each of the electromagnetic transducers 22 includes: a lower magnetic pole layer 220; an upper magnetic pole layer 224; a write gap layer 221, the end portion on the TBS 100 side of the write gap layer 221 being sandwiched between the lower magnetic pole layer 220 and the upper magnetic pole layer 224; a write coil layer 222 formed so as to pass through in every turn at least between the upper and lower magnetic pole layers 224 and 220; and a coil insulating layer 223 for isolating the write coil layer 222 from the upper and lower magnetic pole layers 224 and 220.

The lower magnetic pole layer 220 and the upper magnetic pole layer 224 act as a path of the magnetic flux excited by write current flowing through the write coil layer 222. And one end portions of the upper and lower magnetic pole layers 224 and 220 sandwich the end portion on the TBS 100 side of the write gap layer 221. The leakage magnetic field from the sandwiched end portion of the write gap layer 221 is used for writing. In FIG. 2, the write coil layer 222 has a monolayer structure, however, may have a two or more layered structure or a helical coil shape. Further, the upper shield layer 212 and the lower magnetic pole layer 220 may be substituted with one magnetic layer.

The lower magnetic pole layer 220 is a soft-magnetic layer formed of, for example, NiFe (Permalloy), CoFeNi, CoFe, FeN FeZrN or CoZrTaCr, or a multilayer of these materials with thickness of approximately 0.5 to 3 µm (micrometer), made by using, for example, a frame plating method or a sputtering method. The write gap layer 221 is a non-magnetic layer formed of, for example, $Al_2O_3$ (alumina), $SiO_2$ (silicon dioxide), AlN (aluminum nitride) or DLC (diamond-like carbon) with thickness of approximately 0.01 to 0.05 µm, made by using, for example, a sputtering method or a chemical vapor deposition (CVD) method. The write coil layer 222 is a conductive layer formed of, for example, Cu with thickness of approximately 0.5 to 5 µm, made by using, for example, a frame plating method or a sputtering method. The coil insulating layer 223 is, for example, an insulating resin layer formed of, for example, a heat-cured photoresist such as novolac based with thickness of approximately 0.7 to 7 µm, made by using, for example, a photolithography method. The upper magnetic pole layer 224 is a magnetic layer formed of, for example, NiFe (Permalloy), CoFeNi, CoFe, FeN, FeZrN or CoZrTaCr, or a multilayer of these materials with thickness of approximately 0.5 to 3 µm, made by using, for example, a frame plating method or a sputtering method. The overcoat layer 23 is formed of, for example, stacked non-magnetic insulating materials such as $Al_2O_3$ (alumina), $SiO_2$ (silicon dioxide), AlN (aluminum nitride) or DLC, made by using, for example, a sputtering method or a CVD method.

The groove 20a, extending in the track width direction, is provided on the TBS 100 and in an area on the end surface of the head substrate 20, the area being on the boundary (tangent to the boundary) between the head substrate 20 and the overcoat layer 23. And the groove 24a, also extending in the track width direction, is provided on the TBS 100 and in an area on the end surface of the closure 24, the area being on the boundary (tangent to the boundary) between the overcoat layer 23 and the closure 24. By providing these grooves 20a and 24a, as detailed later by referring to FIGS. 4a and 4b, a space can vanish, which occurs between the surface of the magnetic tape 11 and the element ends of MR elements 21 and electromagnetic transducers 22 due to the presence of concave and convex portions or a recess portion on the TBS 100. As a result, the magnetic spacing, which is a distance between these element ends and the surface of the magnetic tape 11, can keep a sufficiently small value. Furthermore, swarf (dust) generated when the head 10 and the magnetic tape 11 grind each other can be prevented from being stacked and burned to be attached on the TBS 100. As a result, the contact between the tape head 10 and the running magnetic tape 11 becomes favorable; therefore, read and write operations can be performed sufficiently and stably.

The width $W_G$ (FIG. 3b) in the direction along track 110 of each of the grooves 20a and 24a is preferably, for example, approximately 1 µm or more. The length $L_G$ (FIG. 3b) in the track width direction of each of the grooves 20a and 24a preferably exceeds the alignment range in the track width direction of the whole MR elements 21 and electromagnetic transducers 22 (FIGS. 3a and 3b), and is, for example, approximately 30 to 50 mm. Further, The depth $D_G$ (FIG. 3c) of each of the grooves 20a and 24a is, for example, approximately 1 to 1000 nm (nanometers). The thicknesses in the direction along track 110 of the head substrate 20, the overcoat layer 23 and the closure 24 are, for example, approximately 0.5 to 5.0 mm, approximately 10 to 200 µm and approximately 0.3 to 3.0 mm, respectively. The groove 20a is not limited to be provided in the area on the end surface of the head substrate 20; it may be provided in an area covering end surface portions of the head substrate 20 and the overcoat layer 23, the area thus overlapping the boundary between the head substrate 20 and the overcoat layer 23. Also, the groove 24a is not limited to be provided in the area on the end surface of the closure 24; it may be provided in an area covering end surface portions of the overcoat layer 23 and the closure 24, the area thus overlapping the boundary between the overcoat layer 23 and the closure 24.

The terminal electrode 25 includes a lead electrode 250, a base electrode film 251, a bump 252 and a pad 253. The lead electrode 250 is electrically connected with a lead line extending from the MR element 21, the electromagnetic transducer 22 or the heating element 27. On the lead electrode 250, formed is the base electrode film 251 with conductivity, and the bump 252 is formed by using a plating method with the base electrode film 251 as an electrode. The base electrode film 251 and the bump 252 are formed of a conductive material such as Cu. The base electrode film 251 has a thickness of, for example, approximately 10 to 200 nm, and the bump 252 has a thickness of, for example, approximately 5 to 30 µm. The top end of the bump 252 is exposed in the upper surface 235 of the overcoat layer 23. And on the top end of the bump, formed is the pad 253.

FIGS. 3a and 3b show cross-sectional views taken along respective planes B and C shown in FIG. 1b, illustrating a main portion of one embodiment of the thin-film magnetic head according to the present invention. In FIG. 3a, the MR elements 21 appear on the cross-section, and the electromagnetic transducers 22 and the grooves 20a and 24a are presented by dashed lines. Further, FIG. 3c shows a cross-sectional view taken along a plane corresponding to plane A shown in FIG. 1b, illustrating a main portion of an alternative concerning the grooves on the TBS according to the present invention.

As shown in FIGS. 3a and 3b, the MR elements 21 and the electromagnetic transducers 22 are aligned in the track width direction respectively, one ends of which reach the TBS 100. Further, as shown in FIG. 3b, the MR elements 21 and the electromagnetic transducers 22 are positioned, in the direction along track (in the direction perpendicular to the track width direction), between the grooves 20a and 24a, and closer to the grooves 20a than to the groove 24a. In this embodiment, especially by providing the groove 20a, the element ends of MR elements 21 and electromagnetic transducers 22 in the TBS 100 can keep an adequate contact with the running magnetic tape 11, as described in detail later by referring to FIGS. 4a and 4b.

As shown in FIG. 3c, an alternative concerning the groove according to the present invention includes a groove 30a. The groove 30a, extending in the track width direction, is formed on the TBS 100 and in an area on the end surface of a head substrate 30, the area being on the boundary between the head substrate 30 and the overcoat layer 33. While, there is provided no groove in any area on the end surface of the closure 34. MR elements 31 and electromagnetic transducers 32 are positioned, in the direction along track, closer to the grooves 30a than to the boundary between the overcoat layer 33 and the closure 34. Consequently, even in the case that only one groove is provided on one TBS, closer to MR elements and electromagnetic transducers, the contact between the surface of the running magnetic tape and the element ends of MR elements and electromagnetic transducers can become adequate; therefore, read and write operations can be performed sufficiently and stably.

Figure 4A:
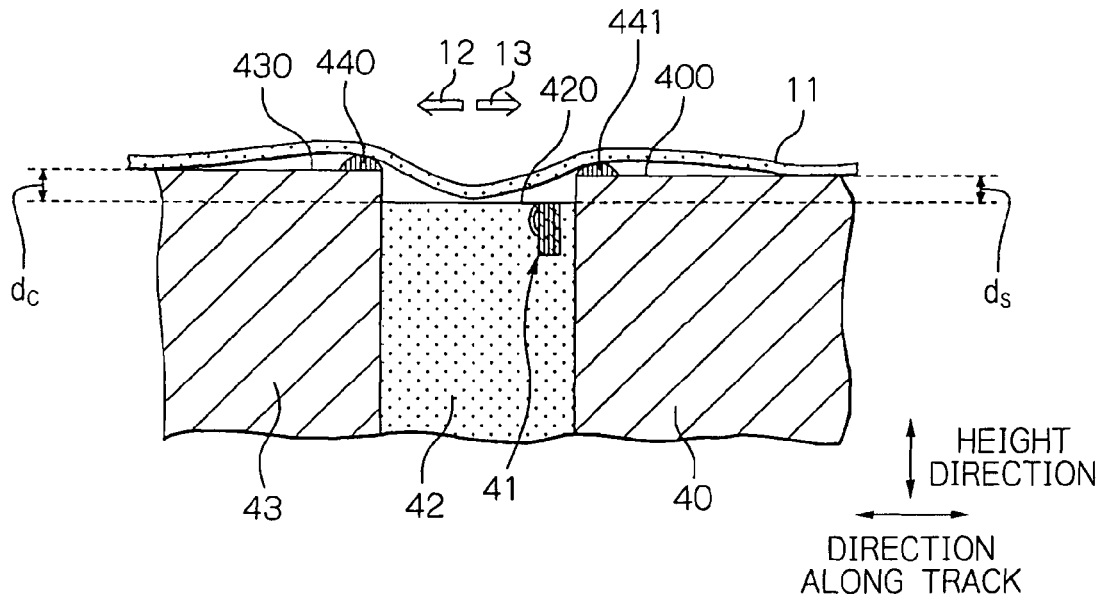
FIGS. 4a and 4b show cross-sectional views taken along a plane corresponding to plane A shown in FIG. 1b, explaining the principle for improving the contact condition between the thin-film magnetic head and the magnetic recording medium by providing the grooves according to the present invention.
Figure 4B:
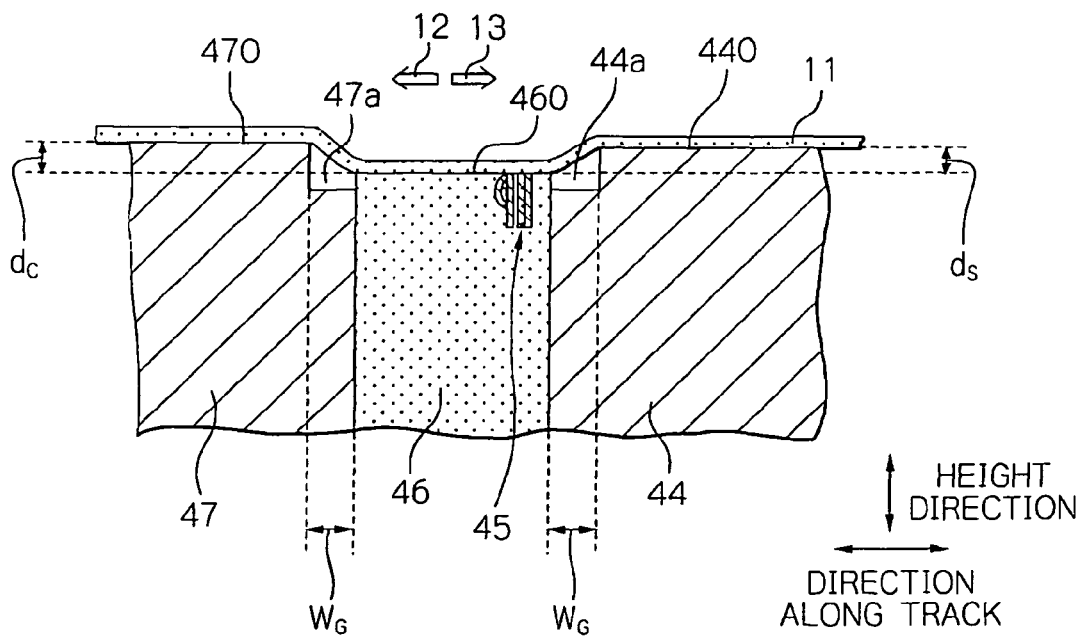

FIGS. 4a and 4b show cross-sectional views taken along a plane corresponding to plane A shown in FIG. 1b, explaining the principle for improving the contact condition between the thin-film magnetic head and the magnetic recording medium by providing the grooves according to the present invention.

FIG. 4a shows the case of a tape head having no grooves according to the present invention. As shown in the figure, a magnetic tape 11 runs in the direction of arrow 12 or 13, being contacted with the TBS consisting of the end surface 400 of a head substrate 40, the end surface 420 of an overcoat layer 42 and the end surface 430 of the closure 43. In such tape heads as this, generally, the end surface 420 is recessed from the end surfaces 400 and 430 in the height direction (the direction perpendicular to the TBS) by the polishing (MR height process) during the head manufacturing process for setting the height in the height direction of the MR elements and forming the TBS. The recess is generated because, generally, the hardness of the overcoat layer is lower than that of the head substrate and the closure. Further, because an error in the adhering position occurs when adhering the closure 43 on the upper surface of the overcoat layer 42, the distance $d_S$ in the height direction between the end surfaces 400 and 420 and the distance $d_C$ in the height direction between the end surfaces 420 and 430 usually become different from each other, even after polishing in the MR height process. The steps formed with the distances $d_C$ and $d_S$ cause a space to be generated between portions of the end surface 420 of the overcoat layer 42 and the magnetic tape 11. Here, for example, in the case that the element end on the TBS side of a magnetic head element 41 consisting of MR elements and electromagnetic transducers is rather close to the step with the distance $d_S$, a space is likely to occur between the element end and the magnetic tape 11, which may cause the increase in magnetic spacing. As a result, there occurs a possibility that read and write operations by the head element 41 cannot be performed sufficiently and stably.

Further, there occurs a possibility that swarf (dust) generated when the tape head and the running magnetic tape 11 grind each other is stacked and burned to be attached on the TBS. For example, in the case that the magnetic tape 11 runs in the direction of arrow 12, a portion of the magnetic tape 11 that has passed through above the end surface 420 of the overcoat layer 42 having comparatively high temperature, is cooled off by the contact with the end surface 430 of the closure 43. As a result, in some cases, swarf 440 dragged by the cooled portion is also cooled off to be stacked on the end surface 430. While, in the case that the magnetic tape 11 runs in the direction of arrow 13, the swarf 441 may be stacked on the end surface 400 of the head substrate 40 in the same way as the swarf 440. The swarfs 440 and 441 attached on the TBS causes the space between the tape head and the running magnetic tape 11 by working as a supporting point, and further causes unstable contact between them. As a result, there occurs a possibility that read and write operations by the head element 41 cannot be performed sufficiently and stably.

FIG. 4b shows the case of a tape head having grooves 44a and 47a according to the present invention. As shown in the figure, as is the case of FIG. 4a, the end surface 460 of the overcoat layer 46 is recessed, in the height direction, from the respective end surfaces 440 and 470 of a head substrate 44 and a closure 47. Further, the end surfaces 440 and 460 are distant, in the height direction, from each other with the distance $d_S$, and the end surfaces 460 and 470 are distant, in the height direction, from each other with the distance $d_C$.

However, the head shown in FIG. 4b is further provided with the grooves 44a and 47a on the TBS, having a predetermined width $W_G$ in the direction along track. In this case, the magnetic tape running in the direction of arrow 12 or 13 is sloped in the range of width $W_G$ when passing through above these grooves 44a and 47a. Therefore, providing the width $W_G$ can cause the steps between the overcoat layer 46 and the respective of head substrate 44 and closure 47 to less affect the tape run; then, the space between the surface of the magnetic tape 11 and the TBS can be decreased, and the magnetic tape 11 can be set to be contacted, without gap, to almost all the portion of the end surface 460 of the overcoat layer 46. As a result, because the element end on the TBS side of the magnetic head element 45 and the magnetic tape 11 are surely contacted with each other, the magnetic spacing can keep a sufficiently small value, which enables read and write operations to be performed sufficiently and stably. That is to say, providing the grooves 44a and 47a can prevent or reduce the negative influence to the contact condition between the element end on the TBS side of the magnetic head element 45 and the magnetic tape 11, the negative influence brought by the recess of the end surface 460 of the overcoat layer 46 or the error in the adhering position of closure 43. Alternatively, for example, in the case that the element end on the TBS side of the magnetic head element 45 is rather closer to the head substrate 44, only providing the groove 44a can effect the appropriate contact.

Furthermore, in the case that swarf (dust) generated when the tape head and the running magnetic tape 11 grind each other is dragged by the running magnetic tape 11, the grooves 44a and 47a prevents the swarf from being stacked on the TBS. For example, when the magnetic tape 11 runs in the direction of arrow 12, a portion of the magnetic tape 11 that has passed through above the end surface 460 of the overcoat layer 46 having comparatively high temperature, is cooled off in the position of the groove 47a before reaching the end surface 470 of the closure 47. On this occasion, the swarf dragged by the tape portion is also cooled off and enters (falls) into the groove 47a. While, in the case that the magnetic tape 11 runs in the direction of arrow 13, generated swarf enters (falls) into the groove 44a in the same way as the groove 47a case. As described above, because providing the grooves 44a and 47a can prevent the swarf from being stacked on the TBS, the tape head and the running magnetic tape 11 are adequately contacted with each other, and thus, read and write operations by head element 45 can be performed sufficiently and stably.

FIGS. 5a to 5e show schematic views illustrating an embodiment of the manufacturing method of the thin-film magnetic head according to the present invention. And FIGS.

Figure 6A:
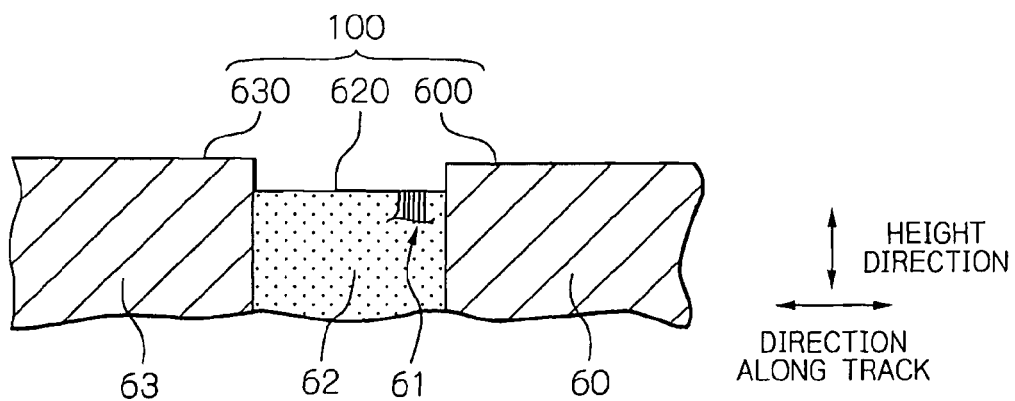
FIGS. 6a to 6c show cross-sectional views illustrating the process for forming grooves on a TBS in the manufacturing method according to the present invention.
Figure 6B:
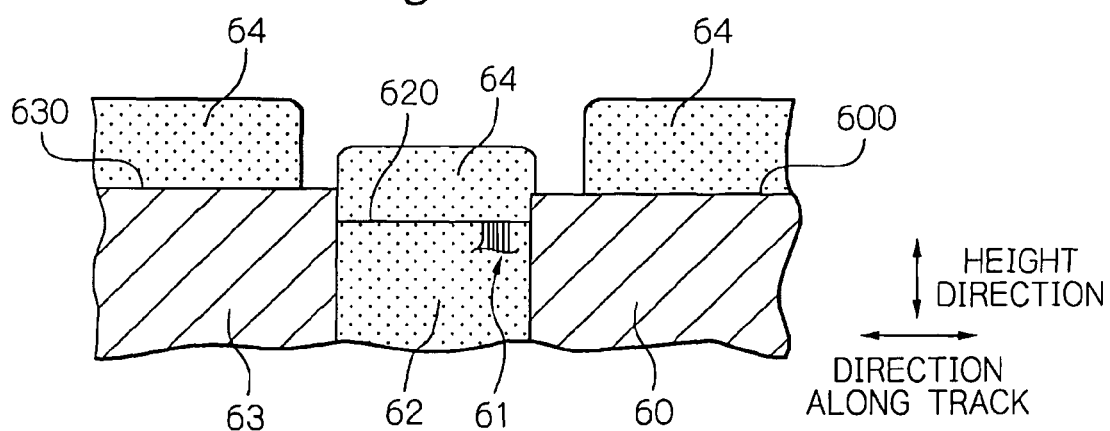
Figure 6C:
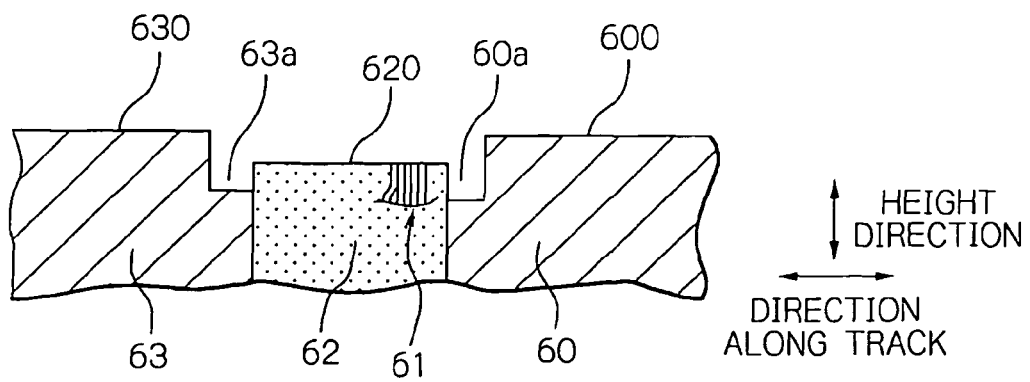

6*a* to 6*c* show cross-sectional views illustrating the process for forming grooves on a TBS in the manufacturing method according to the present invention. The cross-sections shown in FIG. 6*a* to 6*c* are taken along a plane corresponding to plane A shown in FIG. 1*b*.

Figure 5A:
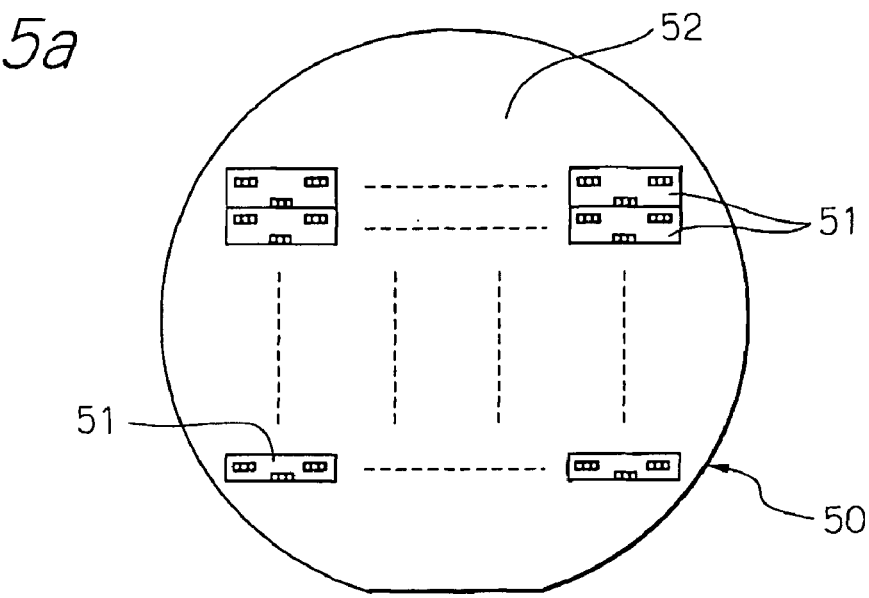
FIGS. 5a to 5e show schematic views illustrating an embodiment of the manufacturing method of the thin-film magnetic head according to the present invention.
Figure 5B:
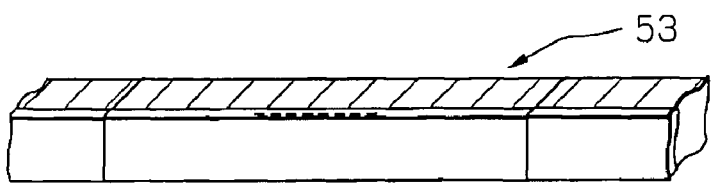
Figure 5C:
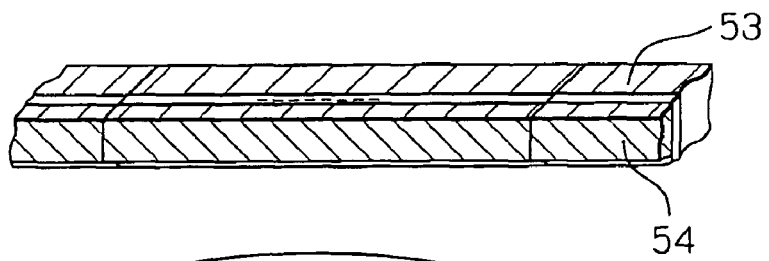

First, as shown in FIG. 5*a*, on the element formation surface of a wafer substrate 50, formed are a plurality of tape head patterns 51 each of which includes MR elements, electromagnetic transducers and the terminal electrodes, and a overcoat film 52 that is to become a overcoat layer. Next, the wafer substrate 50 in which thin-film process has been completed is cut to be separated into, as shown in FIG. 5*b*, row bars 53 on each of which a plurality of tape head patterns is aligned in at least one line. Then, as shown in FIG. 5*c*, the closure block 54 to become closures is adhered on the upper surface of the overcoat layer of the row bar 53.

Figure 5D:
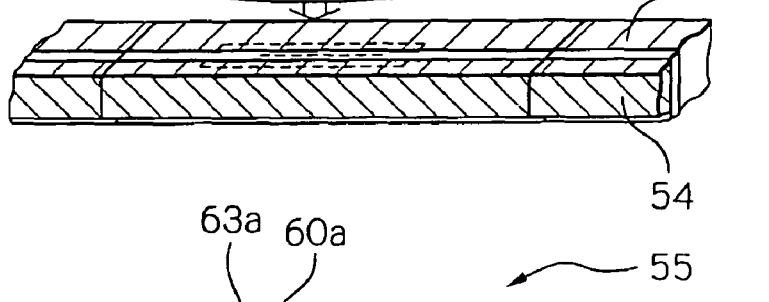
Figure 5E:
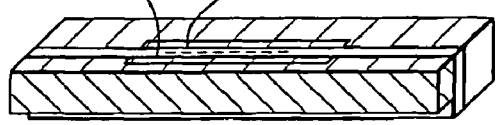

After that, as shown in FIG. 5*d*, performed is an MR height process which is a polishing step for setting the height in the height direction (the direction perpendicular to the TBS) of the MR element and forming the TBS. Next, as detailed later by referring to FIGS. 6*a* to 6*c*, grooves 60*a* and 63*a* are formed in each of the tape head patterns. At the last, as shown in FIG. 5*e*, the row bar 53 on which the closure block 54 has been adhered is cut to be separated into tape heads (first and second head parts), thereby the manufacturing process of the head is finished.

Next, the process for forming the grooves 60*a* and 63*a* on the TBS 100 will be explained by referring to FIGS. 6*a* to 6*c*.

As shown in FIG. 6*a*, in each of tape head parts in the row bar 53 on which the MR height process has been performed, formed is a TBS 100 that consists of the end surface 600 of the head substrate 60, the end surface 620 of the overcoat layer 62 and the end surface 630 of the closure 63. The end surface 620 is recessed from the end surfaces 600 and 630 in the height direction. On the TBS 100, as shown in FIG. 6*b*, a mask pattern 64 is formed. The mask pattern 64 has, on the TBS 100, an open (removed) area on the end surface 600 of the head substrate 60, which is on the boundary (tangent to the boundary) between the head substrate 60 and the overcoat layer 62, and an open (removed) area on the end surface 630 of the closure 63, which is on the boundary (tangent to the boundary) between the overcoat layer 62 and the closure 63. The mask pattern 64 may be, for example, a resist pattern formed by using a photolithography method, or a pattern formed of a non-magnetic insulating material such as DLC.

Next, grooves 60*a* and 63*a* are formed, as shown in FIG. 6*c*, by performing etching to the TBS 100 by means of, for example, an ion milling method or the like, with the mask pattern 64 as a mask, and then by removing the mask pattern 64 with a remover or the like. Here, in the case that a non-magnetic insulating material such as DLC is used for the mask pattern 64, a protective film may be formed by leaving a thin film of the non-magnetic insulating material after the etching. Alternatively, the open (removed) areas of the mask pattern 64 may be: an area covering portions of the end surfaces 600 and 620, the area thus overlapping the boundary between the head substrate 60 and the overcoat layer 62; and an area covering portions of the end surfaces 620 and 630, the area thus overlapping the boundary between the overcoat layer 62 and the closure 63.

FIGS. 7*a* to 7*e* show cross-sectional views illustrating the process for adjusting respective heights of the end surfaces as the TBS after forming the grooves on the TBS, in the manufacturing method according to the present invention. The cross-sections shown in these figures are taken along a plane corresponding to plane A shown in FIG. 1*b*.

Figure 7A:
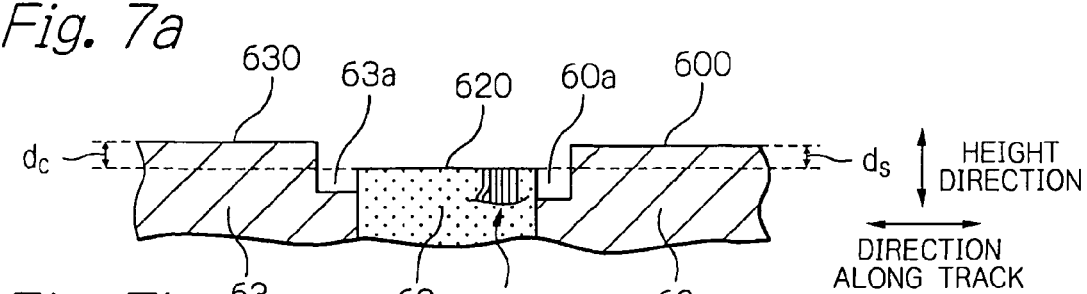
FIGS. 7a to 7e show cross-sectional views illustrating the process for adjusting respective heights of the end surfaces as the TBS after forming the grooves on the TBS, in the manufacturing method according to the present invention.
Figure 7B:
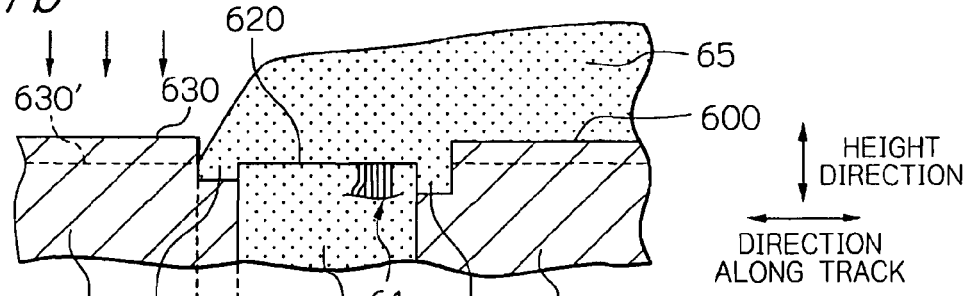

As shown in FIG. 7*a*, in each of tape head parts in the row bar 53 on which the grooves 60*a* and 63*a* are formed, the end surface 620 is recessed from the end surfaces 600 and 630 in the height direction. And the distance $d_S$ in the height direction between the end surfaces 600 and 620 and the distance $d_C$ in the height direction between the end surfaces 620 and 630 are different from each other. This is because an error in the adhering position occurs when adhering the closure block 54 on the upper surface of the overcoat layer (FIG. 5*c*). The adhering position error is may be, for example, approximately ± (plus or minus) 2 nm as the difference (equivalent to $d_C$–$d_S$) in the height direction between the end surface 600 of the head substrate 60 and the end surface 630 of the closure 63. Here, the distance $d_S$ equivalent to the recess amount of the end surface of the overcoat layer 62 can be controlled down to, for example, approximately 10 nm. On this TBS 100, as shown in FIG. 7*b*, a mask pattern 65 is formed. The mask pattern 65 has, on the TBS 100, an open (removed) area on the whole end surface 630 of the closure 63. The position of the end (edge) on the closure 63 side of the mask pattern 65 is allowed to be set, in the direction along track, within the width $W_G$ of the groove 63*a*. That is to say, the positional tolerance of the mask pattern 65 is rather wide. The mask pattern 65 may be, for example, a resist pattern formed by using a photolithography method, or a pattern formed of a non-magnetic insulating material such as DLC.

Figure 7C:
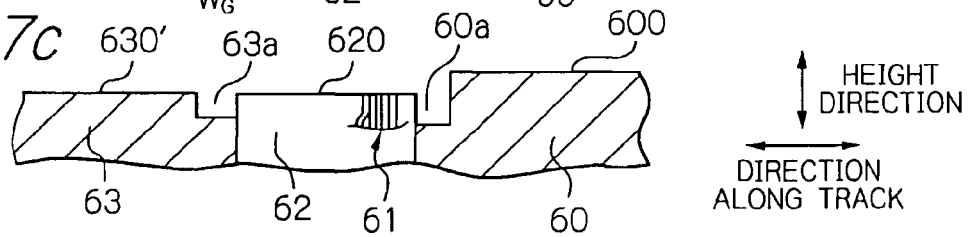

Next, etching is performed to the end surface 630 of the closure 63 by means of, for example, an ion milling method or the like, with the mask pattern 65 as a mask. After that, as shown in FIG. 7*c*, through removing the mask pattern 65 with a remover or the like, the height in the height direction of the end surface 630' of the closure 63 can be set to be closer or equal to the height in the height direction of the end surface 620 of the overcoat layer 62. Here, on determining the amount to be etched of the closure 63, first, the average value of the recess amount of the end surface 620 after performing the MR height process and the average value of the positional error after adhering the closure block 54 on the upper surface of the overcoat layer may be obtained in advance, and then, a required amount of etching can be calculated from the obtained average values. Alternatively, the closure block 54 may be adhered to be misaligned under control in the higher direction with a predetermined amount, an then, a required amount of etching may be calculated on the basis of the predetermined amount. Here, in the case that a non-magnetic insulating material such as DLC is used for the mask pattern 65, a protective film may be formed by leaving a thin film of the non-magnetic insulating material after the etching.

Figure 7D:
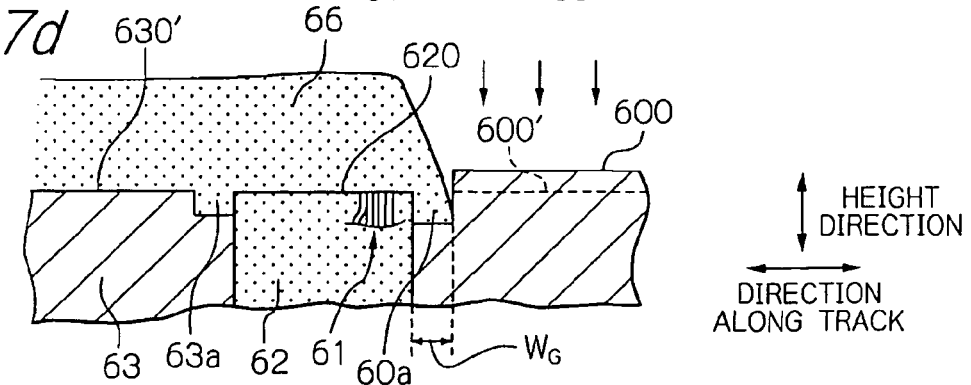

Next, as shown in FIG. 7*d*, on this TBS 100, a mask pattern 66 is formed. The mask pattern 66 has, on the TBS 100, an open (removed) area on the whole end surface 600 of the head substrate 60. The position of the end (edge) on the head substrate 60 side of the mask pattern 66 is allowed to be set, in the direction along track, within the width $W_G$ of the groove 60*a*. That is to say, the positional tolerance of the mask pattern 66 is rather wide. The mask pattern 66 may be, for example, a resist pattern formed by using a photolithography method, or a pattern formed of a non-magnetic insulating material such as DLC.

Figure 7E:
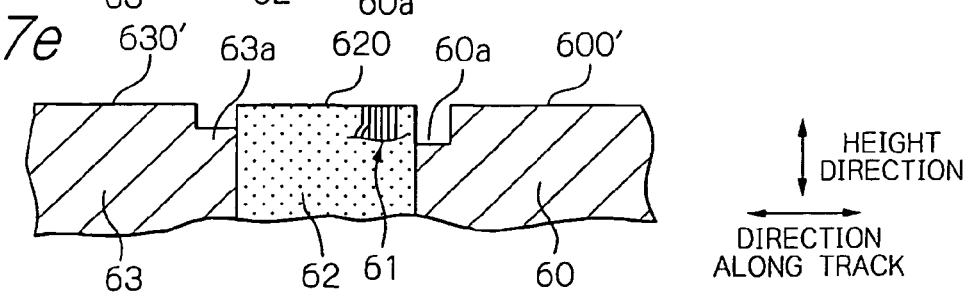

Next, etching is performed to the end surface 600 of the head substrate 60 by means of, for example, an ion milling method or the like, with the mask pattern 66 as a mask. After that, as shown in FIG. 7*e*, through removing the mask pattern 66 with a remover or the like, the height in the height direction of the end surface 600' of the head substrate 60 can be set to be closer or equal to the height in the height direction of the end surface 620 of the overcoat layer 62. Here, on determining the amount to be etched of the head substrate 60, first, the average value of the recess amount of the end surface 620 after performing the MR height process may be obtained in advance, and then, a required amount of etching can be calculated from the obtained average value. Here, in the case that a non-magnetic insulating material such as DLC is used for the mask pattern 66, a protective film may be formed by leaving a thin film of the non-magnetic insulating material after the etching.

As described above, according to the process shown in FIGS. 7a to 7e, respective heights in the height direction of the end surface 600', 620 and 630' of head substrate 60, overcoat layer 62 and closure 63 can be set to be equal with one another, or to be within the allowable range in which the tape head and the magnetic tape can be adequately contacted with each other. Therefore, read and write operations can be performed more reliably.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
   at least one magnetic head element for reading and/or writing data, formed on/above an element formation surface of a substrate;
   an overcoat layer formed on said element formation surface so as to cover said at least one magnetic head element; and
   a closure adhered on at least a portion of an upper surface of said overcoat layer,
   a groove extending in a track width direction, provided on a medium-opposed surface: in an area on an end surface of said substrate, said area being on a boundary between said substrate and said overcoat layer; or in an area covering end surface portions of said substrate and said overcoat layer, said area thus overlapping said boundary between said substrate and said overcoat layer.

2. The thin-film magnetic head as claimed in claim 1, wherein a further groove extending in the track width direction is provided on the medium-opposed surface: in an area on an end surface of said closure, said area being on a boundary between said overcoat layer and said closure; or in an area covering end surface portions of said overcoat layer and said closure, said area thus overlapping said boundary between said overcoat layer and said closure.

3. The thin-film magnetic head as claimed in claim 2, wherein respective heights of end surfaces opposed to a magnetic recording medium of said substrate, said overcoat layer and said closure are equal or substantially equal with one another, said heights being in a direction perpendicular to said end surfaces.

4. A magnetic tape apparatus comprising:
   at least one magnetic tape;
   at least two reels for feeding and/or winding said at least one magnetic tape;
   at least one thin-film magnetic head for reading data from said at least one magnetic tape and/or writing data to said at least one magnetic tape; and
   a recording and/or reproducing control circuit for controlling read and/or write operation performed by said at least one thin-film magnetic head,
   the thin-film magnetic head comprising:
   at least one magnetic head element for reading and/or writing data, formed on/above an element formation surface of a substrate;
   an overcoat layer formed on said element formation surface so as to cover said at least one magnetic head element; and
   a closure adhered on at least a portion of an upper surface of said overcoat layer,
   a groove extending in a track width direction, provided on a medium-opposed surface: in an area on an end surface of said substrate, said area being on a boundary between said substrate and said overcoat layer; or in an area covering end surface portions of said substrate and said overcoat layer, said area thus overlapping said boundary between said substrate and said overcoat layer.

5. The magnetic tape apparatus as claimed in claim 4, wherein a further groove extending in the track width direction is provided on the medium-opposed surface: in an area on an end surface of said closure, said area being on a boundary between said overcoat layer and said closure; or in an area covering end surface portions of said overcoat layer and said closure, said area thus overlapping said boundary between said overcoat layer and said closure.

6. The magnetic tape apparatus as claimed in claim 5, wherein respective heights of end surfaces opposed to said magnetic recording medium of said substrate, said overcoat layer and said closure are equal or substantially equal with one another, said heights being in a direction perpendicular to said end surfaces.

7. A manufacturing method of a thin-film magnetic head comprising steps of:
   forming: at least one magnetic head element for reading and/or writing data; and an overcoat layer so as to cover said at least one magnetic head element, on/above an element formation surface of a substrate;
   adhering a closure on at least a portion of an upper surface of said overcoat layer;
   forming a mask pattern having: an open area on an end surface of said substrate, said open area being on a boundary between said substrate and said overcoat layer; or an open area including end surface portions of said substrate and said overcoat layer, said open area thus overlapping said boundary between said substrate and said overcoat layer, said mask pattern provided on end surfaces to be opposed to a magnetic recording medium of said substrate, said overcoat layer and said closure; and
   performing etching to the mask-pattern-formed end surfaces to form a groove in said open area.

8. The manufacturing method as claimed in claim 7, wherein said mask pattern has: a further open area on an end surface of said closure, said open area being on a boundary between said overcoat layer and said closure; or a further open area including end surface portions of said overcoat layer and said closure, said open area thus overlapping said boundary between said overcoat layer and said closure.

9. The manufacturing method as claimed in claim 7, wherein a resist pattern is used as said mask pattern.

10. The manufacturing method as claimed in claim 7, wherein said etching is performed by using an ion milling method.

11. The manufacturing method as claimed in claim 7, further comprising steps of:
   forming a mask pattern on end surfaces to be opposed to the magnetic recording medium of said substrate and said overcoat layer, after forming said groove; and performing etching to the mask-pattern-formed end surfaces, thereby setting a height in a height direction of a medium-opposed end surface of said closure to be closer or equal to a height in the height direction of a medium-opposed end surface of said overcoat layer, the height direction being perpendicular to the medium-opposed end surfaces of said closure and said overcoat layer.

12. The manufacturing method as claimed in claim 7, further comprising steps of:

forming a mask pattern on end surfaces to be opposed to the magnetic recording medium of said overcoat layer and said closure, after forming said groove; and performing etching to the mask-pattern-formed end surfaces, thereby setting a height in a height direction of a medium-opposed end surface of said substrate to be closer or equal to a height in the height direction of a medium-opposed end surface of said overcoat layer, the height direction being perpendicular to the medium-opposed end surfaces of said substrate and said overcoat layer.

* * * * *